United States Patent

[11] 3,602,528

| [72] | Inventor | John L. Kelly<br>65-H Calle Aragon, Laguna Hills, Calif. 92653 |
|---|---|---|
| [21] | Appl. No. | 835,415 |
| [22] | Filed | June 23, 1969 |
| [45] | Patented | Aug. 31, 1971 |

[54] MOTORCYCLE STABILIZING DEVICE
17 Claims, 19 Drawing Figs.

[52] U.S. Cl. ..................................... 280/293, 280/301
[51] Int. Cl. ..................................... B62h 1/12
[50] Field of Search .......................... 280/293, 295, 296, 304, 301; 180/30

[56] References Cited
UNITED STATES PATENTS

| 2,535,283 | 12/1956 | Groom | 280/293 |
| 2,835,499 | 5/1958 | Andren et al. | 280/293 X |
| 3,236,323 | 2/1966 | Austin | 180/30 |

FOREIGN PATENTS

| 1,423,736 | 11/1965 | France | 280/293 |

*Primary Examiner*—Kenneth H. Betts
*Attorney*—Gausewitz, Carr & Rothenberg

ABSTRACT: This invention is a stabilizing device which prevents a motorcycle from tipping over. The device is mounted on the lower portion of a motorcycle and includes a member which pivots about an axis which is parallel to the longitudinal axis of the motorcycle. The lower portion of the pivotal member extends outwardly from beneath the motorcycle away from either side of the motorcycle. Stops in the stabilizing device prevent the pivotal member from rotating more than a certain number of degrees relative to the motorcycle. The stabilizing device includes outrigger wheel assemblies attached to the lower outermost extremities of the pivotal member. Each of the outrigger wheel assemblies includes a platform which receives the motorcyclist's feet and a caster-mounted wheel which will pivot and follow the direction of motion of the motorcycle whenever the wheel contacts the ground surface.

INVENTOR.
JOHN L. KELLY

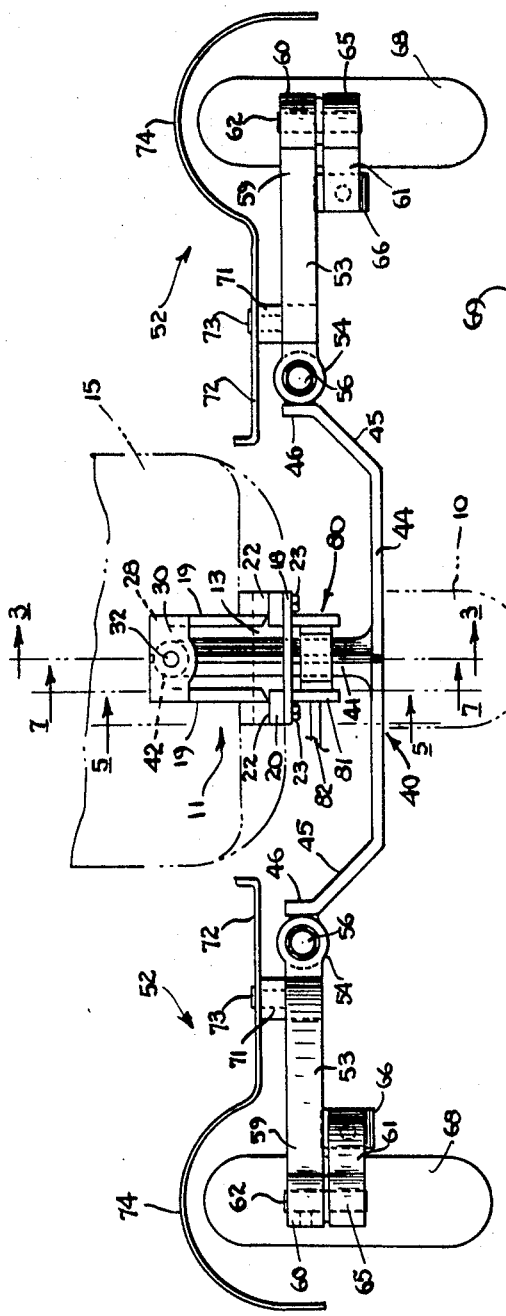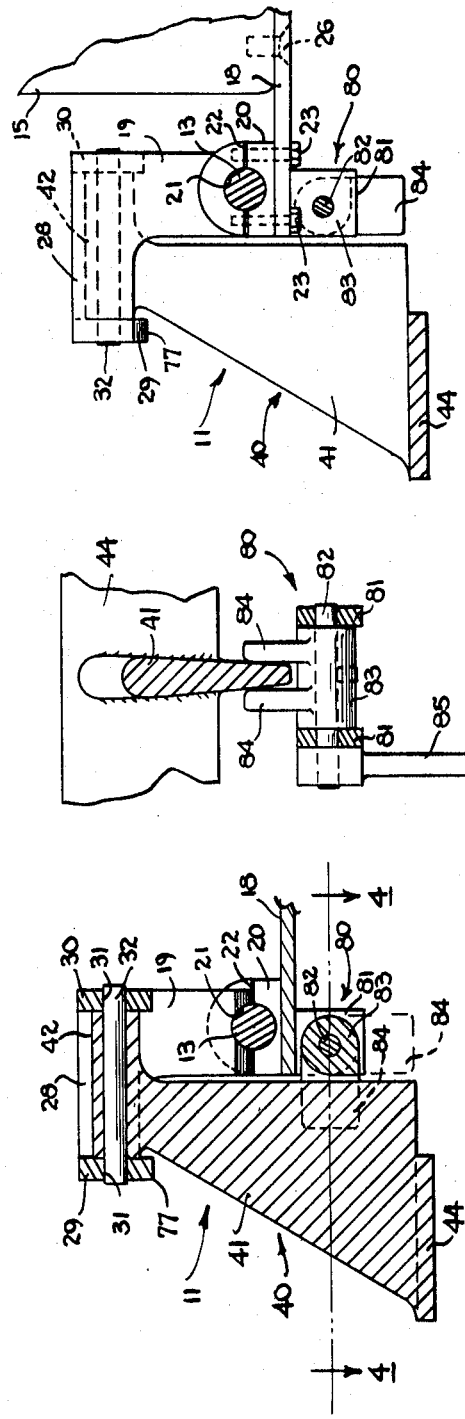

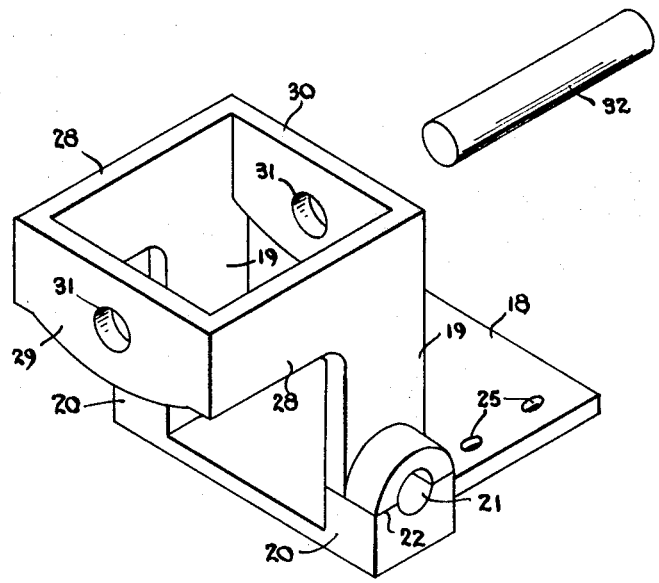
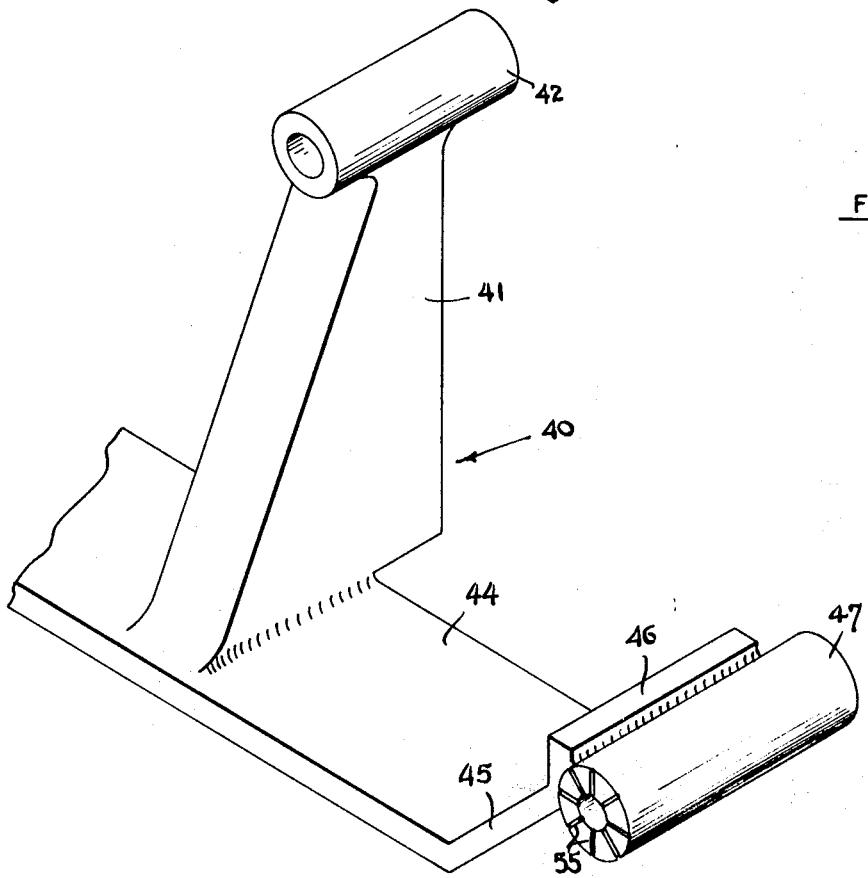
FIG. 8

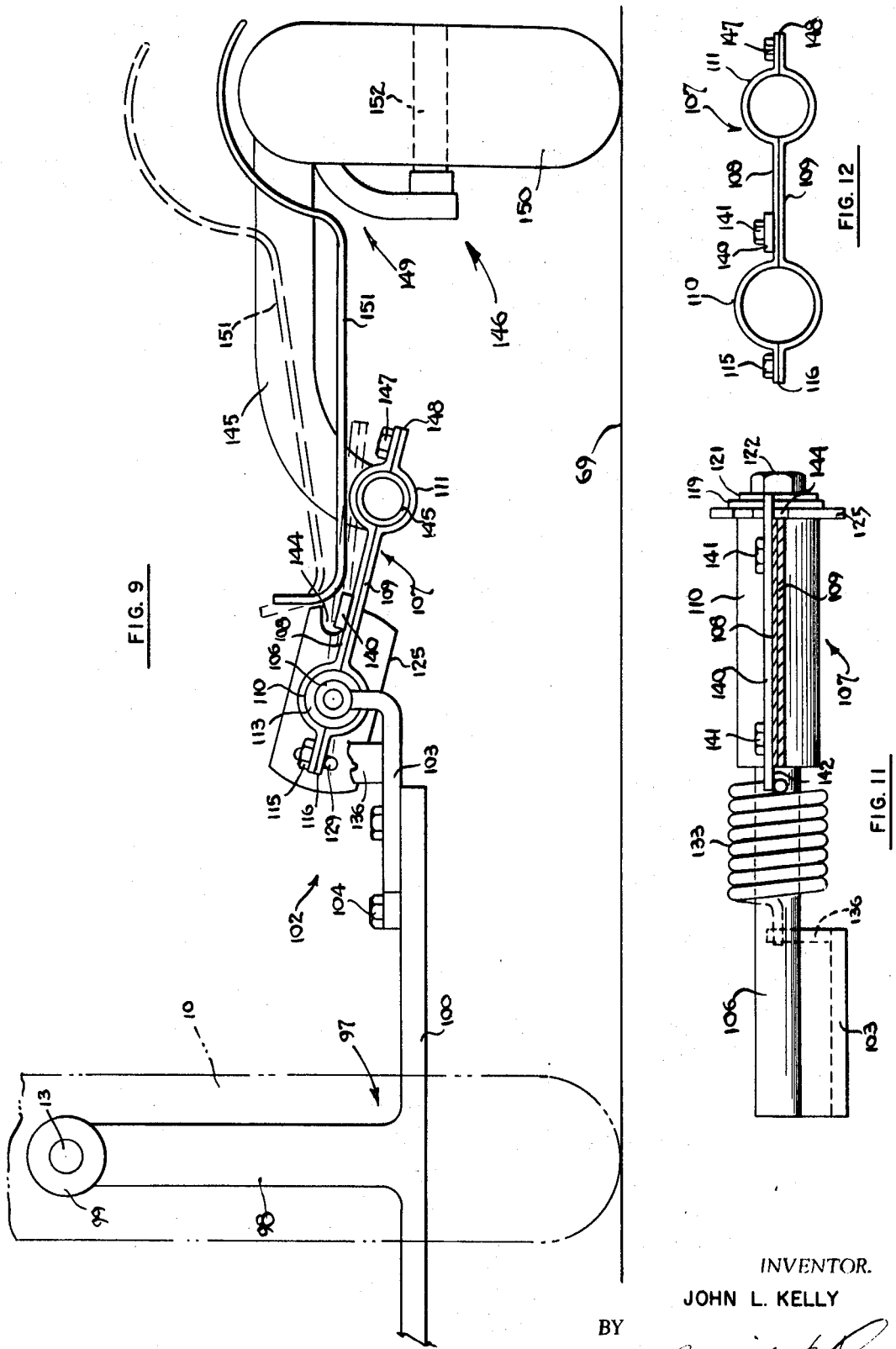

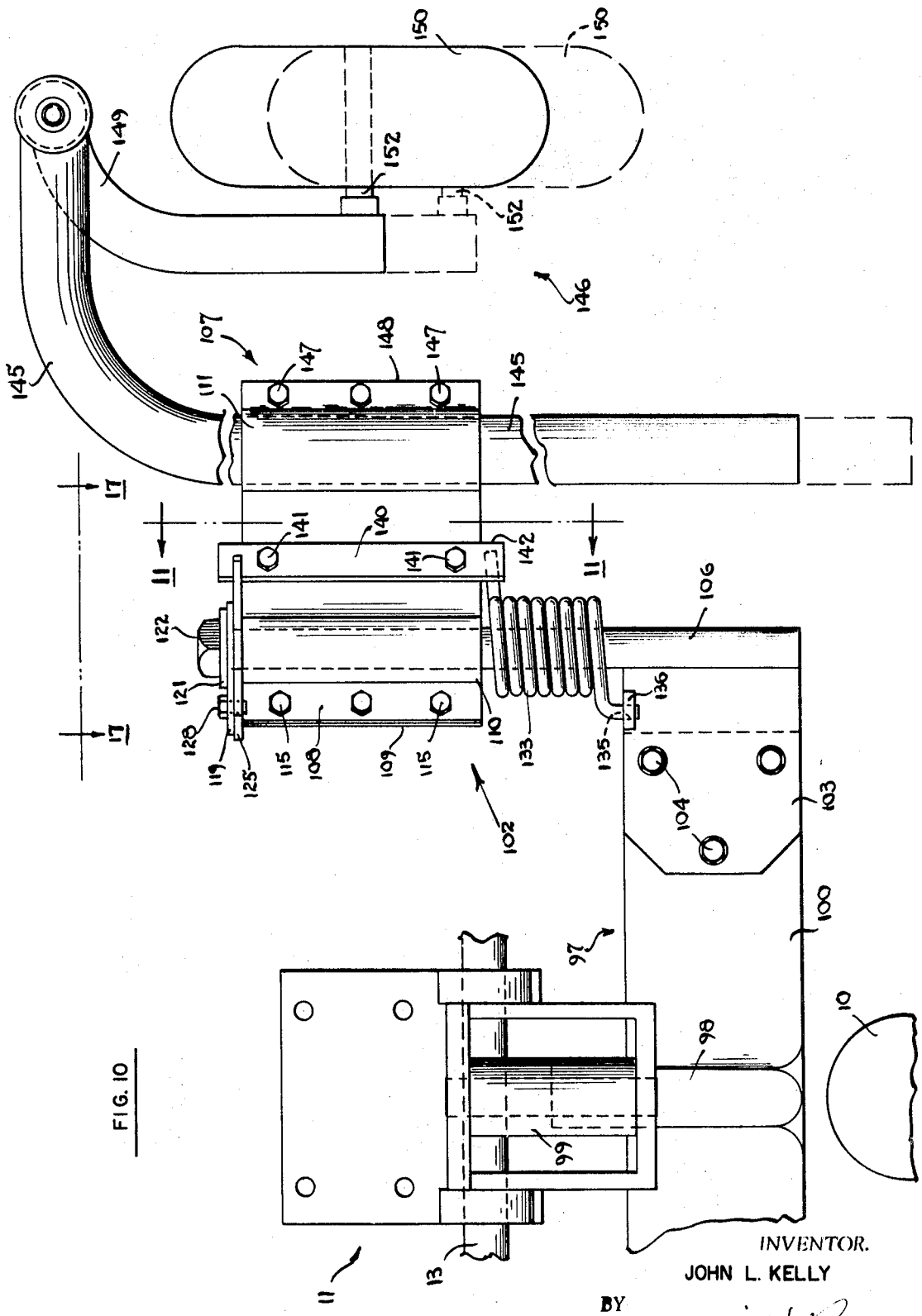

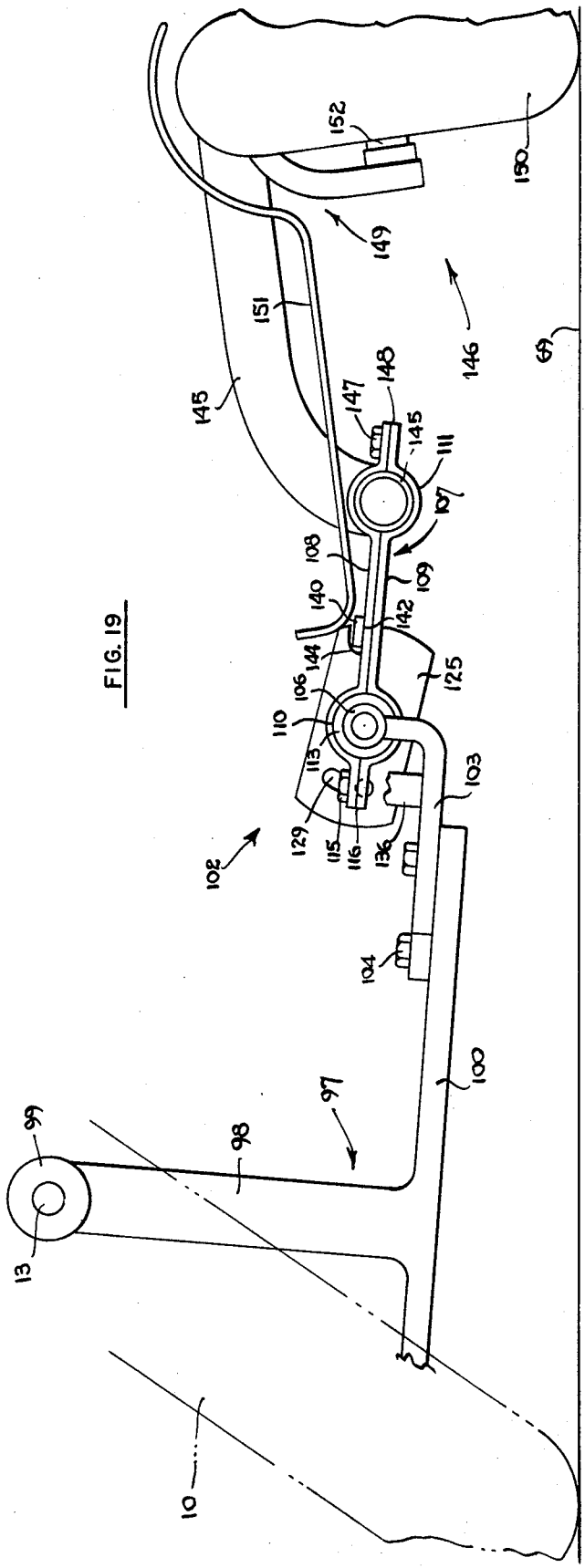
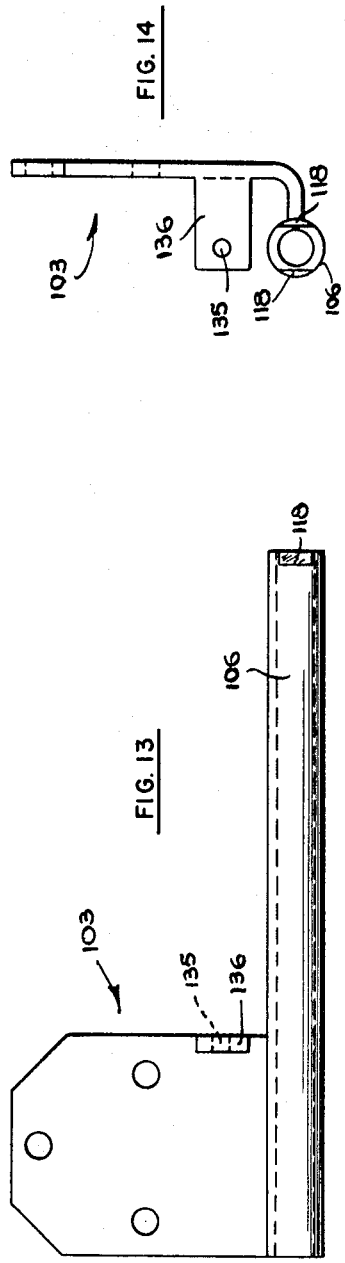

*INVENTOR.*
JOHN L. KELLY
BY
*Jamewitz & Carr*
ATTORNEYS 3,602,528

MOTORCYCLE STABILIZING DEVICE

BACKGROUND OF THE INVENTION

1. Field of the Invention

This invention relates to the field of stabilizing devices for two-wheeled motor vehicles.

2. Description of the Prior Art

Two-wheeled motor vehicles have always been fun and exciting to operate. However, they pose serious threats to the inexperienced and experienced driver alike in that the motorcycle can easily turn over and cause injury to its passenger or operator. The inexperienced operator may hesitate to use a motorcycle because he may be afraid that his unfamiliarity with keeping his balance might cause him to fall, while the experienced motorcyclist knows that there is always the danger that his motorcycle will hit an oil spot, some loose sand, wet leaves, or other slick spots in the road surface and skid dangerously sideways or tip over.

Various stabilizing devices have been devised to prevent a motorcycle from tipping over when the motorcycle was not skidding sideways, but they could not effectively control or stabilize motorcycle when it began such a skid. A motorcycle in a sideways skid is extremely dangerous because it is very difficult for the motorcyclist to control the motorcycle or to maintain his balance. The prior art devices did not effectively aid the motorcyclist when this occurred.

The prior art stabilizing devices have usually been very complicated and difficult to assemble and install on a motorcycle. Once installed, they have been difficult and time consuming to detach from the motorcycle if this should be desired. Also, prior stabilizers have been proportioned for vehicles of particular dimensions, and have not been usable on motorcycles of different sizes or made by different manufacturers.

Summary of the Invention

The present invention provides platforms that a motorcyclist can step on to regain his balance whenever his motorcycle skids out of control or begins to tip over. The stabilizing device is attached to the lower portion of the motorcycle frame directly in front of the rear wheel. The device also includes a shaft that is parallel to the longitudinal axis of the motorcycle and is positioned above the lower portion of the motorcycle frame. Platforms are attached to the lower outermost portions of a frame member which pivots about the above-described shaft.

Wheels are mounted on the lower outboard portions of the platforms in caster-type mountings, which allow the wheels to automatically align themselves with the direction of motion of the motorcycle whenever they contact the ground surface. Both of the wheels on the stabilizing device will normally clear the ground surface while the motorcycle is in operation. However, when the motorcycle banks, the auxiliary wheel on the lower side will be brought into engagement with the supporting surface to enable the motorcycle to be stabilized.

In one embodiment of this invention, each platform is pivotally mounted on the outermost portion of the frame member, whereby each platform may be pivoted downwardly until both of the auxiliary wheels are simultaneously brought into engagement with the ground surface. This prevents a rocking motion to bring one wheel or the other into contact with the supporting surface when the motorcycle is stopped. The platforms are spring-loaded upwardly, and normally will be positioned so that both wheels of the stabilizing device are elevated above the supporting surface. The platforms are also adjustable so that they may be raised or lowered, relative to the frame member of the stabilizing device, without changing the relative angle between the frame member and the platforms. This feature is particularly useful when the wheels on the stabilizing device are changed to a different diameter or when the stabilizing device is attached to a motorcycle of a different size or construction.

Both embodiments of the stabilizing device include stops which prevent the pivotal frame member from rotating relative to the motorcycle beyond a limited number of degrees. When the motorcycle begins to tip over, the pivotal member will rotate relative to the motorcycle until it contacts a stop. When this occurs, the stabilizing device will prevent any further rotation of the motorcycle and will hold the motorcycle in a partially upright position.

The pivotal member may be locked in its central position, which will prevent the motorcycle from tipping more than a few degrees toward either side. The stabilizing device in this position is used in parking the motorcycle or in providing a beginning motorcyclist with a very stable vehicle on which to take his first few rides.

An object of this invention is to provide a stabilizing device for motorcycles which will enable a motorcyclist to regain his balance by pushing on the platforms of the stabilizing device with his feet.

Another object of this invention is to provide a stabilizing device for two-wheeled vehicles which will prevent the vehicle from falling over.

A further object of this invention is to provide a stabilizing device which may be quickly and easily attached to and detached from a motorcycle.

A still further object of this invention is to provide a stabilizing device which will allow a motorcyclist to maintain or regain control of his motorcycle when it begins to slide dangerously sideways.

An additional object of this invention is to provide a stabilizing device that is adjustable to permit its attachment to motorcycles having different characteristics and dimensions.

These and other objects will become apparent from the following detailed description taken in connection with the accompanying drawing.

BRIEF DESCRIPTION OF THE DRAWING

FIG. 2 is a front elevational view of the stabilizing device showing its position relative to the motorcycle frame;

FIG. 3 is an enlarged central longitudinal sectional view of the connection unit, locking mechanism and T-shaped frame member taken along line 3—3 of FIG. 2;

FIG. 4 is an enlarged sectional view of the locking mechanism of the stabilizing device taken along line 4—4 of FIG. 3;

FIG. 5 is an enlarged longitudinal sectional view of the connection unit, T-shaped frame member, and locking mechanism of the stabilizing device, taken along line 5—5 of FIG. 2, showing their position relative to the motorcycle engine;

FIG. 8 is an exploded perspective view of the connection unit and the T-shaped frame member;

FIG. 9 is a partial rear elevational view of a modified motorcycle-stabilizing device that allows both outrigger wheels to be brought simultaneously into engagement with the supporting surface;

FIG. 10 is a fragmentary top plan view of the modified motorcycle stabilizing device;

FIG. 11 is a sectional view taken along line 11—11 of FIG. 10;

FIG. 12 is an end elevational view of a hinge unit, separated from the remaining components of the stabilizer;

FIG. 13 is a top plan view of a base member of the stabilizer, separated from the assembly;

FIG. 14 is an end elevational view of the base member;

FIG. 19 is a partial rear elevational view of the modified motorcycle-stabilizing device, similar to that of FIG. 9, but illustrating the device in the position assumed when the motorcycle banks.

DESCRIPTION OF THE PREFERRED EMBODIMENTS

Figure 1:
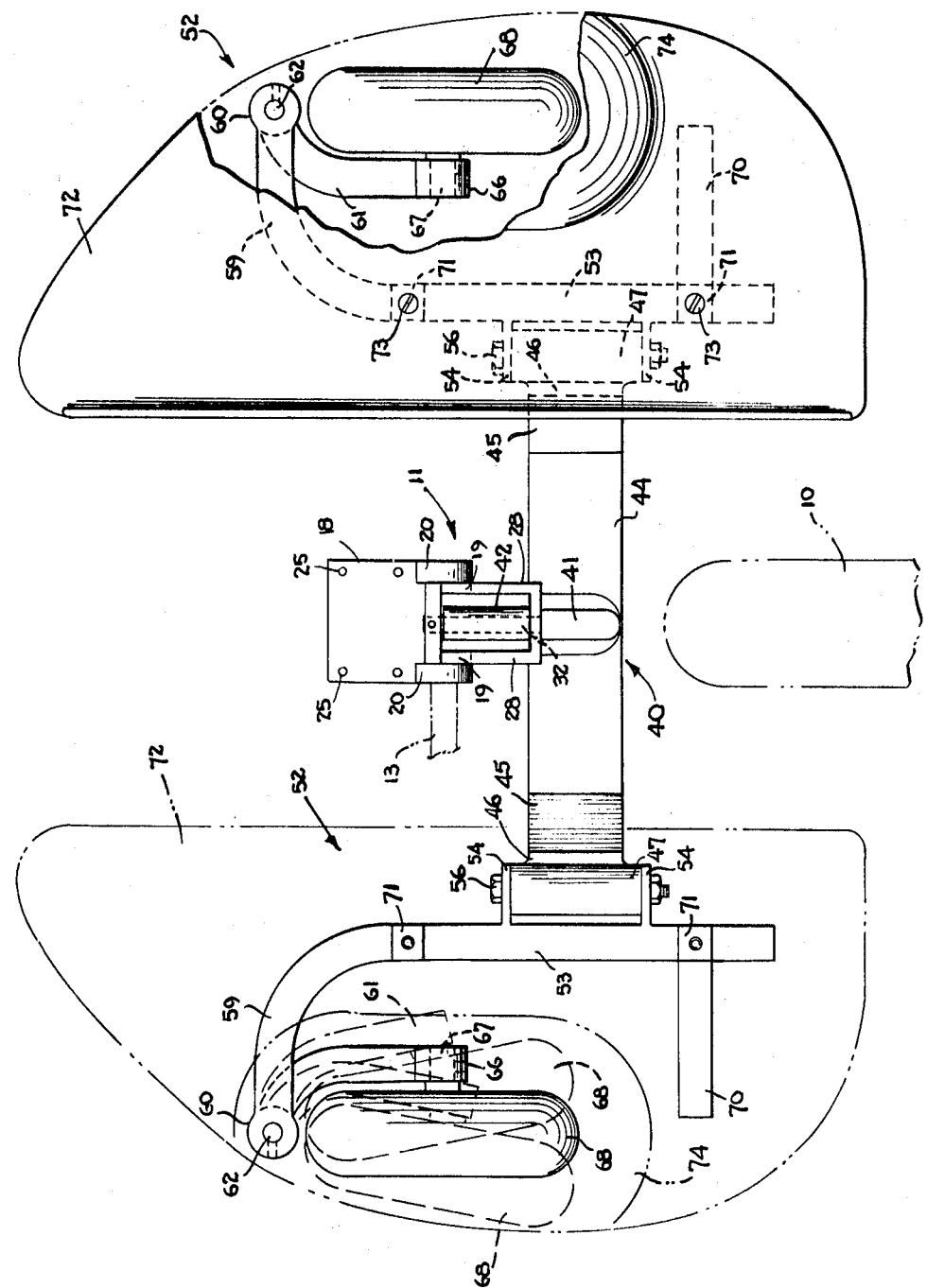
FIG. 1 is a top plan view of the motorcycle stabilizing device.
Figure 7:
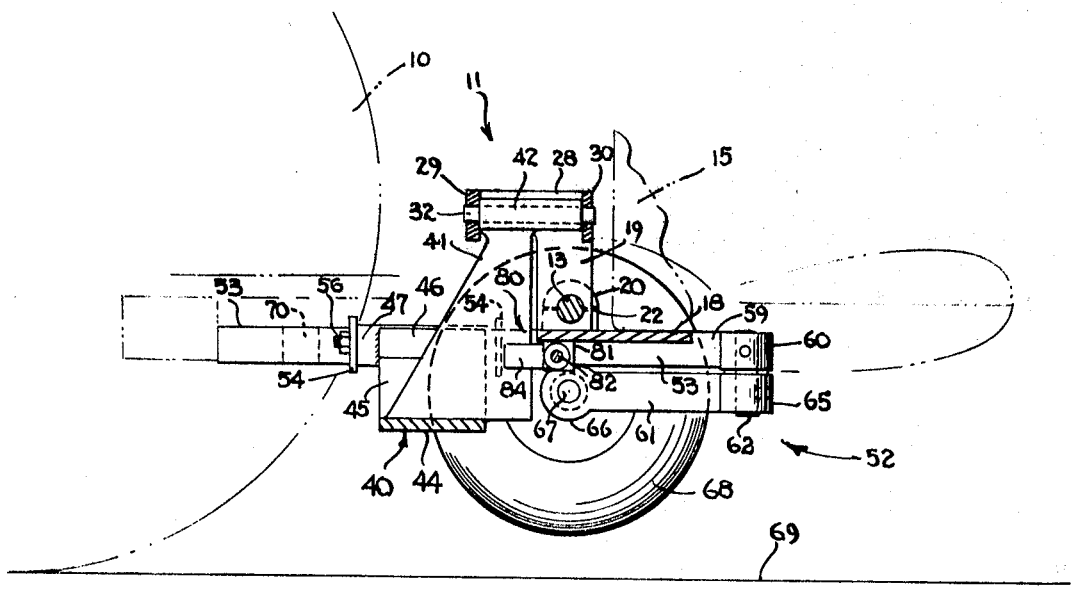
FIG. 7 is a sectional view of the stabilizing device taken along line 7—7 of FIG. 2, showing the position of the stabilizing device with respect to the engine and rear wheel of the motorcycle.

The stabilizing device is attached to a motorcycle directly in front of the rear wheel 10 of the motorcycle, as shown in FIGS. 1 and 7. The stabilizing device includes a connection unit 11 that is fastened around the horizontal shaft 13 of the motorcycle and attached to the bottom of the engine 15 of the motorcycle. The kickstand of a motorcycle is normally positioned in front of the rear wheel 10 of the motorcycle and in back of the motorcycle engine 15. Before attaching the stabilizing device to the motorcycle, the kickstand would normally be removed from the motorcycle, but the horizontal shaft 13 of the kickstand is retained since the stabilizing device is designed to be attached to that member.

The connection unit 11, as shown in FIG. 8, is comprised of a baseplate 18 having two parallel upwardly extending columns 19 positioned on the outer rearward portion of plate 18. Each of the columns 19 includes a thick lower portion 20 having a horizontal cylindrical hole 21. The columns 19 are severed along a horizontal plane 22 passing through the axes of holes 21. The connection unit 11 is coupled around the motorcycle kickstand shaft 13 and fastened together by screws 23 which extend upwardly through baseplate 18 into the thick portion 20 of the columns 19 above the cylindrical holes 21, as shown in FIG. 5.

Holes 25 in baseplate 18 are provided for connecting the connection unit 11 to the bottom of the motorcycle engine 15. Screws 26 extend upwardly through the baseplate 18 into the casing of the engine 15, as shown in FIG. 7. The connection unit 11 is rigidly attached to the motorcycle in this manner.

As shown in FIG. 8, the connection unit 11 includes two parallel plates 28 that extend rearwardly from the upper portions of columns 19. Two transverse end members 29 and 30 complete the boxlike structure in the upper part of the connection unit 11. The rearward end member 29 extends between the rearward edges of the plates 28. The forward end member 30 extends between the upper forward edges of columns 19. Cylindrical openings 31 in the end members 29 and 30 receive a shaft 32. Shaft 32 is positioned between and is equidistant from plates 28 and is also parallel to the longitudinal axis of the motorcycle.

The stabilizing device includes an inverted T-shaped frame member 40 that is pivotally attached to the connection unit 11. The inverted T-shaped frame member 40 includes an upright portion 41 which has a cylindrical sleeve 42 rigidly attached to its uppermost end, as shown in FIG. 8. The cylindrical sleeve 42 receives the shaft 32 in the connection unit 11, while the end members 29 and 30 in the connection unit 11 prevent the sleeve 42 from moving longitudinally along the axis of shaft 32. The upright member 41 extends downwardly between plates 29 of the connection unit 11 and passes in back of the kickstand shaft 13 of the motorcycle. The transverse member 44 of the inverted T-shaped member, shown in FIGS. 2 and 8, extends outwardly away from either side of the motorcycle, and includes diagonally rising sections 45 terminating in short vertical sections 46. Tubular members 47, whose axes are parallel to cylindrical sleeve 42, are rigidly attached to the outer portions of the vertical sections 46 of the transverse member 44.

The motorcycle stabilizing device includes a pair of outrigger wheel assemblies 52 (see FIG. 1) which are attached to the tubular members 47 on the T-shaped frame member 40. The outrigger wheel assemblies 52 include frame or support members 53, each of which has a pair of brackets 54 extending inwardly and fitting adjacent to the ends of tubular members 47. The outer edges of tubular members 47 and the inner edges of brackets 54 include shallow radially extending teeth 55 (see FIG. 8) which, when pressed together, will prevent any rotational movement between the outrigger wheel assemblies 52 and the tubular members 47. Bolts 56 extend through the brackets 54 and along the axes of tubular members 47 and clamp the brackets 54 securely against the outer edges of tubular members 47. After the bolts 56 are tightened, the outrigger wheel assemblies 52 and the T-shaped frame member 40 move together as a rigid unit since no relative movement between the parts is possible.

The forward ends 59 of frame members 53, as shown in FIg. 1, extend laterally away from the connection unit 11 and include vertical cylindrical sleeves 60. L-shaped members 61 are positioned below the frame members 53 in the outrigger wheel assemblies 52. The members 61 are pivotally associated with frame members 53 by pins 62 that extend through sleeves 60 in frame members 53 and into corresponding vertical sleeves 65 situated at the forward portions of the L-shaped members 61. The rearward portions of the L-shaped frame members 61 include horizontal sleeves 66 which receive the inwardly extending axles 67 of wheels 68. The wheels 68 are positioned immediately behind pins 61 in such a manner that the extended central planes of wheels 68 pass through and include the axes of pins 62. This mounting configuration provides a caster action for wheels 68. Therefore, when a wheel 68 engages the ground or supporting surface 69, regardless of the direction of motion of the motorcycle, the wheel can freely pivot about pin 62, as shown in phantom in FIG. 1, to automatically align itself with the direction of motion of the motorcycle.

The frame members 53 include braces 70 which extend outwardly from the rearward portion of the base members 53. Spacers 71 separate the frame members 53 and braces 70 from platforms 72 which are attached to the frame members 53 and braces 70 by bolts 73. The platforms 72 are designed to support the feet of the operator of the motorcycle. The platforms 72 are generally flat but include raised portions 74 which extend above and over the upper portions of the wheels 68.

When the stabilizing device is attached to a motorcycle and the motorcycle is in motion in an upright position, no part of the stabilizing device normally contacts the ground surface 69. The operator of the motorcycle places his feet on the platforms 72 as he rides the motorcycle. When the motorcycle begins to bank or to tip over, a wheel 68 on the stabilizing device, on the side toward which the motorcycle is banking or tipping will contact the road surface 69. When this occurs, the platform 72 whose wheel 68 is contacting the ground surface 69 becomes, in effect, a portable section of roadway that the motorcyclist can step on or push against to maintain or regain his balance.

If the motorcycle begins to slide sideways for any reason, the wheel 68 in contact with the ground will pivot about pin 62 and automatically align itself with the direction of motion of the motorcycle. Even when the motorcycle is sliding sideways, the stabilizing device provides a platform 72 which the motorcyclist may use to regain his balance.

Figure 6:
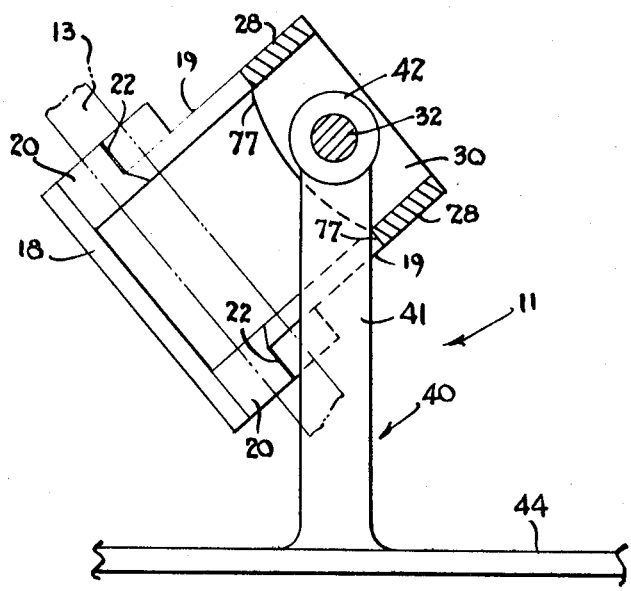
FIG. 6 is an enlarged transverse sectional view of the connection unit and the upright portion of the T-shaped frame member showing the maximum relative rotation between these two members.

If the motorcycle continues to bank or tip over, the motorcycle will rotate relative to the stabilizing device until the upright portion 41 of the inverted T-shaped frame member 40 comes into contact with a lower edge 77 of one of the plates 28 in the connection unit 11. When this occurs, as shown in FIG. 6, the edge 77 acts as a stop and further rotation of the motorcycle relative to the stabilizing device is prevented. The stabilizing device will then hold the motorcycle in the partially upright position shown in FIG. 6 and will prevent the motorcycle from tipping all the way over and injuring the motorcyclist.

The T-shaped frame member 40 has a relatively high pivot axis resulting from the connection of the upper end of the upright portion 41 to the upper section of the unit 11. Consequently, there is a lateral shifting of the platforms 72 whenever the motorcycle banks toward one side. The platforms 72 will shift toward the side toward which the motorcycle is banking. This shifting action insures that the platform 72, on the side toward which the motorcycle is banking, will remain outboard far enough away from the motorcycle to enable the motorcyclist to keep his feet on the platform and effectively use the platform to regain or maintain his balance. The platform 72 which the motorcyclist will use to regain his balance will move away from and not toward the motorcycle, giving the motorcyclist greater leverage when he needs it most.

A locking mechanism 80 is positioned on the bottom of baseplate 18 of the connection unit 11 just forward of the upright portion 41 of the T-shaped frame member 40. This mechanism is used to hold the T-shaped frame member in its central position aligned with the vertical axis of the motorcycle and prevent the frame member from rotating relative to the motorcycle. The locking mechanism 80 may be used when parking the motorcycle since the motorcycle can tilt sideways only a few degrees before a wheel 68 of the stabilizing device will contact the ground surface 69 and prevent further tilting movement of the motorcycle.

The locking mechanism 80, as shown in FIGS. 3 and 4, includes a pair of brackets 81 extending downwardly from baseplate 18 of the connection unit 11. The brackets 81 receive a shaft 82 whose axis is parallel to that of kickstand 13. Rigidly connected to shaft 82 is a sleeve 83 having a pair of parallel lugs 84 which extend radially outwardly from sleeve 83. The shaft 82 extends beyond one of the brackets 81 and is rigidly attached to an arm 85. When the arm 85 is rotated to its unlocked position, the lugs 84 extend downwardly beneath the shaft 82 and do not interfere with the pivoting motion of frame member 40, as shown in FIG. 5. When the arm 85 is rotated to its locked position, the lugs 84 are rotated to a position where the upright portion 41 of the T-shaped frame member is received between them, as shown in FIG. 4. This prevents the upright member from rotating about the axis of pin 32.

The stabilizing device can be detached from the motorcycle merely by removing the screws 23 in the connection unit 11 and by removing the screws 26 that pass through baseplate 18 into the engine casing The stabilizing device can then be attached to a different motorcycle by reversing the above procedure.

The wheels 68 on the outrigger wheel assemblies 52 can be raised or lowered by loosening bolts 56 and rotating the outrigger wheel assemblies 52 about tubular members 47 and then retightening bolts 56, which will then rigidly connect the outrigger assemblies 52 to the tubular members 47. This feature makes the stabilizing device adaptable to numerous motorcycles even though the distances between the kickstand shaft 13 and the ground or supporting surface 69 might vary among different motorcycles.

When the motorcycle is brought to a stop, it will rotate slightly to one side or the other to bring an outrigger wheel 68 into engagement with the supporting surface 69. This necessarily takes place because the motorcycle will not remain balanced in an upright position, and only one of the wheels can touch the supporting surface at a time. Hence, there is a slight teetering effect, and the motorcycle may rock from one wheel 68 to the other if the center of gravity is shifted from side to side by the movement of the operator. While this does not affect the operation of the stabilizing device, the slight rocking so permitted may be considered objectionable by some persons. To avoid this condition, and to give the motorcyclist the opportunity to simultaneously bring both of the outrigger wheels 68 into engagement with the ground surface 69, the motorcycle-stabilizing device may be modified as short in FIGS. 9 through 19.

Referring in particular to FIGS. 9 and 10, a modified inverted T-shaped frame member 97 includes an upright portion 98 having a cylindrical sleeve 99 in its upper end. The modified frame member 97 also includes a transverse part 100 extending from the lower end of the upright portion 98. At either end of the transverse portion 100 of the member 97 is a connection assembly 102. Each connection assembly 102 includes a base member 103 which is rigidly attached to an outer end of the transverse frame portion 100 by screws 104. Each connection assembly 102 also includes a tubular cylindrical shaft 106 which is rigidly positioned on the outermost portion of the base member 103, and which projects forwardly beyond the base member 103. The axes of shafts 106 are parallel to the axes of sleeve 99 on the modified T-shaped member 97.

Attached to the forward end of each shaft 106 is a hinge 107, shown separately in FIG. 12. Each hinge 107 includes two generally flat elements 108 and 109 having parallel, semicylindrical portions at their opposite edges. When the hinge member 107 is assembled, as shown in FIG. 12, the flat elements 108 and 109 are brought into engagement, and their edge portions cooperate to define two cylindrical sleeves 110 and 111.

A bearing sleeve 113 of elastomeric material, such as rubber, is positioned on the forward end of each shaft 106, each rubber sleeve 113 being enclosed by the sleeve 110 of a hinge 107. The rubber sleeve 113 between each shaft 106 and each hinge 107 allows pivotal movement of the hinges 107 about the shafts 106. With the sleeves 110 positioned over the rubber bearing sleeves 113 on shafts 106, screws 115 are extended through the projecting portions 116 at the edges of the sleeve 110, holding the two sections of the sleeves 110 together and clamped around the bearing sleeves 113.

The forward end of each shaft 106 includes two opposed flat, parallel indentations 118, best shown in FIGS. 13 and 14. An end plate 119 (see FIG. 15), having an aperture 120 corresponding to the cross-sectional shape of each shaft 106 at the indentations 118, is positioned on the forward end of each shaft 106. The flat sides of the opening 120 and the indentations 118 hold the end plate 119 against rotation relative to the shaft 106. A washer 121, as seen in FIG. 11 is positioned adjacent each end plate 119, which prevents the end plates 119 from moving forwardly off the shafts 106. A screw 122 extends through each washer 121 and connects with the threaded interior portion of the shaft 106.

A hinge limit plate 125 (see FIG. 10), having a circular aperture 126 corresponding to the outer diameter of shaft 106, is positioned on each shaft 106 between the end plate 119 and the hinge 107. Each hinge limit plate 125 is attached to the adjacent end plate 119 by a screw 128 (shown in FIGS. 10 and 17) which extends through an arcuate slot 129 and into a tapped hole 130 in the end plate 119. When the screw 128 is tightened, the hinge limit plate 125 is rigidly attached to the adjacent end plate 119 and prevented from rotation relative to the shaft 106. The slot 129 has the shape of a circular segment coaxial with the shaft 106.

Referring now to FIGS. 10 and 11, a torsion spring 133 is mounted on each shaft 106 and is positioned between the base member 103 and the hinge 107. One end of each spring 133 extends into a hole 135 in a bracket 136 which extends upwardly from the base member 103. The other end of each spring 133 reacts against a hinge stop bar 140 which is rigidly attached to the flat central portion 108 of the hinge member 107 by screws 141. Each hinge stop bar 140 extends rearwardly beyond the hinge 107 (see FIG. 10 and 11), the exposed lower surface 142 of each hinge stop bar 140 engaging the forward end of the adjacent spring 133.

Each hinge stop bar 140 also extends forwardly beyond hinge 107 (best shown in FIGS. 11 and 17) and passes through a notch 144 in the adjacent hinge limit plate 125. The notch 144 is wider than the thickness of the bar 140. As a result, the hinge 107 is allowed to pivot about the axis of the shaft 106, but such movement is limited by the engagement of the stop bar 140 with the edges of the notch 144.

The tubular sleeve 111 of each hinge 107 receives the shaft or frame member 145 of an outrigger wheel assembly 146, which is generally similar to the outrigger wheel assembly 146, which is generally similar to the outrigger wheel assembly 52 previously described. The frame members 145 of the outrigger wheel assemblies 146 are rigidly attached to the hinges 107 by tightening screws 147 which extend through openings in outer portions 148 of the hinges adjacent the sleeves 111, clamping the sleeves 111 onto the frame members. At the opposite ends of the frame members 145 are caster mountings 149 for the outrigger wheels 150.

Referring now to FIG. 9, when the motorcycle is in an upright position, no part of the stabilizing device normally contacts the ground surface 69. In this position, as shown in phantom in FIG. 9, the outrigger wheel assemblies were elevated and the wheels 150 clear the surface 69. Each torsion spring 133 reacts against the lower surface 142 of the hinge stop bar 140, causing the hinge 107 to pivot counterclockwise (for the outrigger wheel assembly 146 shown in FIG. 9 about the axis of shaft 106. This lifts the outrigger wheel assembly 146 upwardly as the hinge 107 pivots about shaft 106. The upward movement of the wheel assembly 146 is limited by the engagement of the hinge stop bar 140 with the upper edge of the notch 144 in the hinge limit plate 125.

While neither of the wheels 150 on the stabilizing device normally contacts the ground or road surface 69, the pivotal spring-biased connection assemblies 102 allow both of the wheels 150 to be simultaneously brought into engagement with the surface 69 when desired. To do this, the operator of the motorcycle need only exert a downward force on each of the platforms 151 on the outrigger wheel assembies 146. This overcomes the force of the spring 133, rotating the wheel assembly 146 downwardly. This pivots the wheel assembly 146 in a clockwise direction about the axis of the shaft 106, as the device is shown in FIG. 9, until the outrigger wheel 150 engages the ground surface 69, as shown in solid lines.

This feature of the modified motorcycle-establishing device is particularly useful, as previously indicated, when the motorcycle is moving at very low speeds or is standing still. During such periods, the operator of the motorcycle can bring both of the outrigger wheels 150 into engagement with the ground surface 69, thereby completely stabilizing the motorcycle. The double-sleeve feature of the hinges 107 allows the outrigger wheel assemblies 146 to be raised or lowered relative to the ground surface 69 or transverse portion 100 of the modified T-shaped frame member 97, without changing the relative angle between the outrigger wheel assemblies 146 and the ground surface 69 or the transverse member 100.

Figure 18:
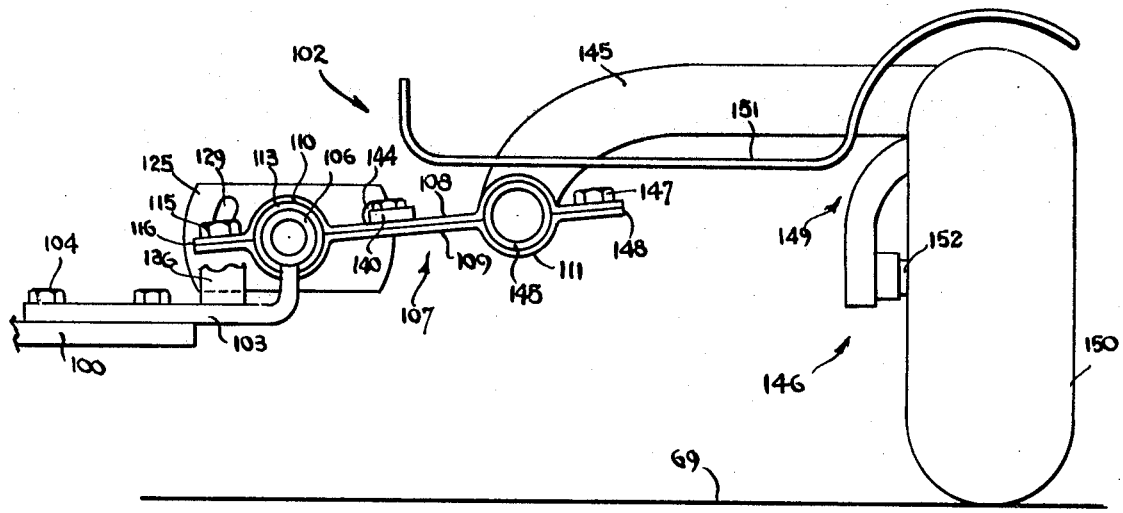
FIG. 18 is a partial rear elevational view of the modified motorcycle-stabilizing device adjusted to accommodate a larger outrigger wheel than that shown in FIG. 9.
Figure 17:
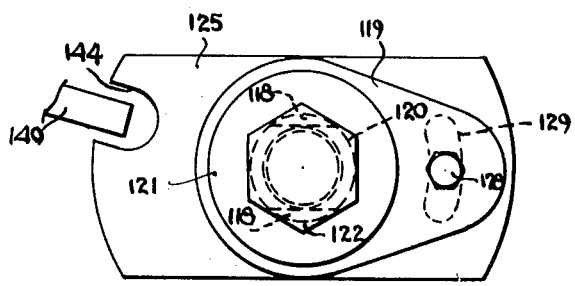
FIG. 17 is a fragmentary end elevational view of a portion of the stabilizer, illustrating the adjustable arrangement for limiting the pivotal movement of the hinge.
Figure 16:
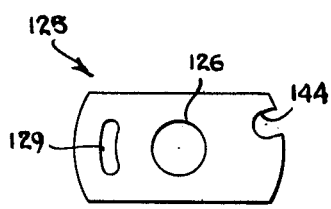
FIG. 16 is an elevational view of a hinge limit plate.
Figure 15:
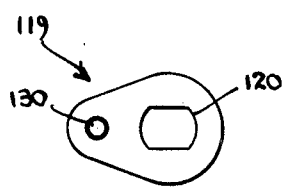
FIG. 15 is an elevational view of an end plate of the stabilizer.

In some instances, it may be preferred to use outrigger wheels that are larger in diameter than the wheel 150 shown in FIG. 9. When this is done, the hinges are adjusted to position the wheel axle 152 higher so that the larger wheels will not contact the surface 69 when in the upwardly retracted position. As shown in FIG. 18, a larger outrigger wheel 153 is attached to the stabilizing device, yet the platform 151 is parallel to the ground surface 69 when the wheel 153 is brought into engagement with the ground surface 69. Release of a downward force on the platform 151 will allow the wheel 153 to be raised upwardly to clear the surface 69 because the axle 152 has been raised.

To adjust the unit to accommodate the larger wheels 153, the screw 128 that extends through the arcuate slot 129 in each hinge limit plate 125 is loosened. When this is done, the hinge limit plates may be rotated about the axes of shafts 106, As the device is depicted in FIGS. 9 and 19, the hinge limit plate 125 is rotated counterclockwise about shaft 106 from its initial position as shown in FIG. 9 to the position shown in FIG. 18. This elevates the notch 144 in the outer edge of the plate 125. As this occurs, the fastener 128 shifts, relative to the hinge limit plate 125, along the arcuate slot 129. The fastener 128 is then retightened to clamp the plate 125 against the end plate 119 so that the plate 125 again is prevented from rotation about the shaft 106.

The screws 147 adjacent the sleeve 111 of the hinge 107 are loosened, which allows the frame member 145 of the outrigger wheel assembly 146 to be pivoted about the axis of sleeve 111. The outrigger wheel assembly 146 is rotted clockwise about the axis of sleeve 111 until angle between the hinge 107 and the platform 151 of the outrigger wheel assembly 146 is as shown in FIG. 18. The screws 147 are then retightened to rigidly connect the outrigger wheel assembly 146 to the hinge 107 and retain the adjusted position.

When the stabilizing device attached to a motorcycle having a lower kickstand shaft 13, the outrigger wheels 150 will be positioned nearer to the ground surface 69 than desired. This requires an adjustment similar to that made when larger wheels are installed. Conversely, when smaller wheels are used, or if the kickstand shaft 13 is higher, the outrigger wheel assemblies may be adjusted downwardly. This is accomplished in the manner described above, but with the parts being rotated oppositely. The double-sleeve feature of hinges 107 allows the outrigger wheel assemblies 146 to be both raised and lowered without changing the relative angle between the outrigger wheel assemblies and the ground surface 69.

It may sometimes be desirable to change the position of the outrigger wheels 150 relative to the motorcycle. When the center of gravity of the motorcycle is shifted rearwardly, such as when a second passenger is sitting behind the operator of the motorcycle, or when used with a different motorcycle relatively heavier to the rear, the outrigger wheels 150 may be moved rearwardly to compensate for the change in the center of gravity. To effect the longitudinal shifting of the outrigger wheels 150, the screws 147 are loosened and the frame members 145 are moved axially of the sleeves 111 in the hinges 107 until the desired position of the outrigger wheels 150 is obtained. By tightening screws 147, the frame members 145 are rigidly connected to the hinges 107. Referring to FIG. 10, the phantom view shows an alternate rearwardly shifted position of the outrigger wheels 150. The frame member 145 of the outrigger wheel assembly 146 may be moved forwardly relative to the sleeve 111 in hinge 107, as well as rearwardly to compensate for a forward shift in the center of gravity.

The general operation of the modified motorcycle-stabilizing device shown in FIGS. 9 through 19 is the same as that of the first-described embodiment stabilizing device shown in FIGS. 1 through 8. When the motorcycle is negotiating a turn, as shown in FIG. 19, the outrigger wheel 150 on one side is brought into engagement with the surface 69, stabilizing the motorcycle. The upward reaction of the force component on the wheel 150 is transmitted through the shaft 106 to the lower portion 100 of the T-shaped frame member 97. The stabilizing device will prevent the motorcycle from tipping all will give the motorcyclist a platform which he can step on and push against in order to regain or maintain his balance even when the motorcycle is skidding sideways in what otherwise would be a dangerous slide.

I claim:
1. A motorcycle-stabilizing device comprising
a connecting element,
said connecting element being adapted to be rigidly attached to a motorcycle,
a frame member,
means pivotally connecting said frame member to said connecting element,
said frame member including transverse means extending laterally outwardly away from said connecting element on either side thereof,
said connecting element including a duality of spaced members,
said frame member extending between said members of said connecting element,
said members of said connecting element being engageable by said frame member upon a predetermined amount of pivotal movement of said frame member relative to said connecting element, whereby said members of said connecting element prevent said frame member from rotating, relative to said connecting element, beyond predetermined limits, a duality of outrigger wheel assemblies, and means connecting each of said outrigger wheel assemblies to said transverse means of said frame member so that said outrigger wheel assemblies are positioned on either side of said connecting element, each of said outrigger wheel assemblies including a ground-engageable wheel, each of said outrigger wheel assemblies including a caster-type mounting for each of said ground-engageable wheels, whereby said wheels are allowed to automatically align themselves with the direction of motion of said stabilizing device whenever said wheels contact the ground surface.

2. A device as recited in claim 1 in which said members of said connecting elements are two parallel plates positioned equidistant from and on opposite sides of the pivotal axis of said frame member.

3. A motorcycle stabilizing device comprising
a connecting element,
said connecting element being adapted to be rigidly attached to a motorcycle,
a frame member,
means pivotally connecting said frame member to said connecting element,
said frame member including transverse means extending laterally outwardly away from said extending laterally outwardly away from said connecting element on either side thereof,
a duality of outrigger wheel assemblies,
and means connecting each of said outrigger wheel assemblies to said transverse means of said frame member so that said outrigger wheel assemblies are positioned on either side of said connecting element,
said means connecting said outrigger wheel assemblies to said transverse means including means for adjusting the positions of said outrigger wheel assemblies in the fore and aft direction relative to said frame member,
each of said outrigger wheel assemblies including a ground-engageable wheel,
each of said outrigger wheel assemblies including a caster-type mounting for each of said ground-engageable wheels,
whereby said wheels are allowed to automatically align themselves with the direction of motion of said stabilizing device whenever said wheels contact the ground surface.

4. A motorcycle stabilizing device comprising
a connecting element
said connecting element being adapted to be rigidly attached to a motorcycle,
a frame member.
means pivotally connecting said frame member to said connecting element,
said frame member including transverse means extending laterally outwardly away from said connecting element on either side thereof,
a duality of outrigger wheel assemblies,
and means connecting each of said outrigger wheel assemblies to said transverse means of said frame member so that said outrigger wheel assemblies are positioned on either side of said connecting element,
each of said outrigger wheel assemblies including a ground-engageable wheel,
said means connecting said outrigger wheel assemblies to said transverse means including selectively adjustable means for allowing said wheels on said outrigger assemblies to be raised or lowered,
said selectively adjustable means including means for maintaining said wheels of said outrigger wheel assemblies at substantially the same angle relative to said transverse means upon said raising and lowering of said wheels,
each of said outrigger wheel assemblies including a castor-type mounting for each of said ground-engageable wheels,
whereby said wheels are allowed to automatically align themselves with the direction of motion of said stabilizing device whenever said wheels contact the ground surface.

5. A device as recited in claim 4 in which each of said selectively adjustable means includes
a first shaft and sleeve unit connected to said transverse means,
a second shaft and sleeve unit connected to said outrigger wheel assembly,
and means for individually positioning said first and second shaft and sleeve units in different relative rotational positions.

6. A device as recited in claim 5 in which at least one of said sleeve and shaft units includes a shaft and sleeve relatively axially movable for thereby adjusting the position of each outrigger wheel assembly along the direction of the axes of said relatively axially movable shaft and sleeve.

7. A motorcycle-stabilizing device comprising
a connecting element,
said connecting element being adapted to be rigidly attached to a motorcycle,
a frame member,
means pivotally connecting said frame member to said connecting element,
said frame member including transverse means extending laterally outwardly away from said connecting element on either side thereof,
a duality of outrigger wheel assemblies,
means connecting each of said outrigger wheel assemblies to said transverse means of said frame member so that said outrigger wheel assemblies are positioned on either side of said connecting element,
each of said outrigger wheel assemblies including a ground-engageable wheel,
each of said outrigger wheel assemblies including a ground-engageable wheel,
each of said outrigger wheel assemblies including a caster-type mounting for each of said ground-engageable wheels,
whereby said wheels are allowed to automatically align themselves with the direction of motion of said stabilizing device whenever said wheels contact the ground surface,
means for allowing limited vertical movement of said ground-engageable wheels between lowered positions for simultaneously engaging a supporting surface and elevated positions for clearing said surface, and resilient means biasing said ground-engageable wheels to said elevated positions thereof.

8. A device as recited in claim 7 in which, for said means for allowing limited movement of said ground-engageable wheels, each of said means connecting said outrigger wheel assemblies to said transverse means includes a hinge means on either side of said transverse means.

9. A device as recited in claim 8 in which each of said hinge means includes
a shaft connected to said transverse means of said frame member,
a sleeve rotatably receiving said shaft,
means connecting said sleeve to an outrigger wheel assembly,
and a stop means for limiting the relative rotational movement of said sleeve and said shaft.

10. In combination with a motorcycle having spaced forward and rearward wheels, a stabilizing device which will prevent a motorcycle from turning over comprising
a connecting element rigidly attached to said motorcycle intermediate its forward and rearward wheels,
a frame member,
a shaft pivotally connecting said frame member to said connecting element,
said frame member extending downwardly from said shaft and extending outwardly away from either side of said motorcycle,
a duality of outrigger wheel assemblies,
and means attaching one of said outrigger wheel assemblies to the outer portion of either end of said frame member,
said outrigger wheel assemblies each including a ground-engageable wheel mounted thereon,
said ground engageable wheels being positioned at an elevation so that neither of said ground-engageable wheels normally contacts the ground surface when said motorcycle is in an upright position,
said outrigger wheel assemblies including a caster-type mounting for each of said ground-engageable wheels, whereby said wheels are allowed to automatically align themselves with the direction of motion of said motorcycle whenever said wheels contact the ground surface,
said shaft being generally parallel to the longitudinal axis of said motorcycle for thereby permitting rotation of said frame member relative to said connecting element and said motorcycle and the engagement of either of said ground-engageable wheels with the surface beneath the same.

11. A device as recited in claim 10 in which said shaft is at an elevation higher than the axes of said ground-engageable wheels.

12. A device as recited in claim 10 in which each of said outrigger wheel assemblies includes a platform adapted to support a foot of the operator of said motorcycle.

13. A device as recited in claim 10 in which said attaching means includes
a duality of hinge means,
one of said hinge means being adjacent each of said outrigger wheel assemblies and allowing limited pivotal movement of said adjacent outrigger wheel assembly relative to said frame member,
whereby both of said ground-engageable wheels may be brought simultaneously into engagement with said ground surface upon downward pivotal movement of said outrigger wheel assemblies about said hinge means,
said hinge means each having a pivot axis generally parallel with the axis of said shaft connecting said frame member to said connecting element,
and resilient means biasing adjacent outrigger wheel assemblies upwardly about said hinge pivot axes,
whereby said ground-engageable wheels normally are maintained out of engagement with said ground surface when said motorcycle is in an upright position.

14. A device as recited in claim 10 in which each of said attaching means includes
a second shaft,
a hinge member pivotally receiving said second shaft,
a member rigidly attached to said second shaft,
said hinge member having an element extending into said notch,
whereby the pivotal movement of said hinge member about said second shaft is limited by said notch in said member,
and resilient means biasing said hinge member to a position whereby said adjacent outrigger wheel assembly is pivoted about said second shaft away from said ground surface.

15. A device as recited in claim 10 in which each of said attaching means includes
adjustable means to rigidly attach one of said outrigger wheel assemblies to said frame member whereby said outrigger wheel assembly may be raised or lowered relative to said frame member without changing the relative angle between said outrigger wheel assembly and said frame member.

16. A device as recited in claim 10 in which each of said attaching means includes
a second shaft which is rigidly attached to one of said outer portions of said frame member,
a sleeve of elastomeric material receiving said second shaft,
a hinge member having two sleeves,
one of said sleeves of said hinge member receiving said sleeve of elastomeric material,
said outrigger wheel assembly having a third shaft extending into the outer of said sleeves of said hinge member around said sleeve of elastomeric material,
and means for clamping said other sleeve of said hinge member around said third shaft.

17. A device as recited in claim 16 in which said sleeves of said hinge member are substantially parallel to the longitudinal axis of said motorcycle.

PO-1050
(5/69)

UNITED STATES PATENT OFFICE
CERTIFICATE OF CORRECTION

Patent No. 3,602,528　　　　　　　　　Dated　August 31, 1971

Inventor(s)　John L. Kelly

It is certified that error appears in the above-identified patent and that said Letters Patent are hereby corrected as shown below:

Column 9, line 42, "direction" should read -- directions --.
Column 10, line 7, "castor-type" should read -- caster-type --.
Column 12, between lines 15 and 16 insert -- said member having a notch on one edge thereof, --; line 42, "outer" should read -- other --.

Signed and sealed this 28th day of March 1972.

(SEAL)
Attest:

EDWARD M. FLETCHER, JR.　　　　　　ROBERT GOTTSCHALK
Attesting Officer　　　　　　　　　Commissioner of Patents